Oct. 31, 1933.    V. G. APPLE    1,932,391
MOLD FOR MAKING ARMATURES
Filed Aug. 2, 1930    4 Sheets-Sheet 1
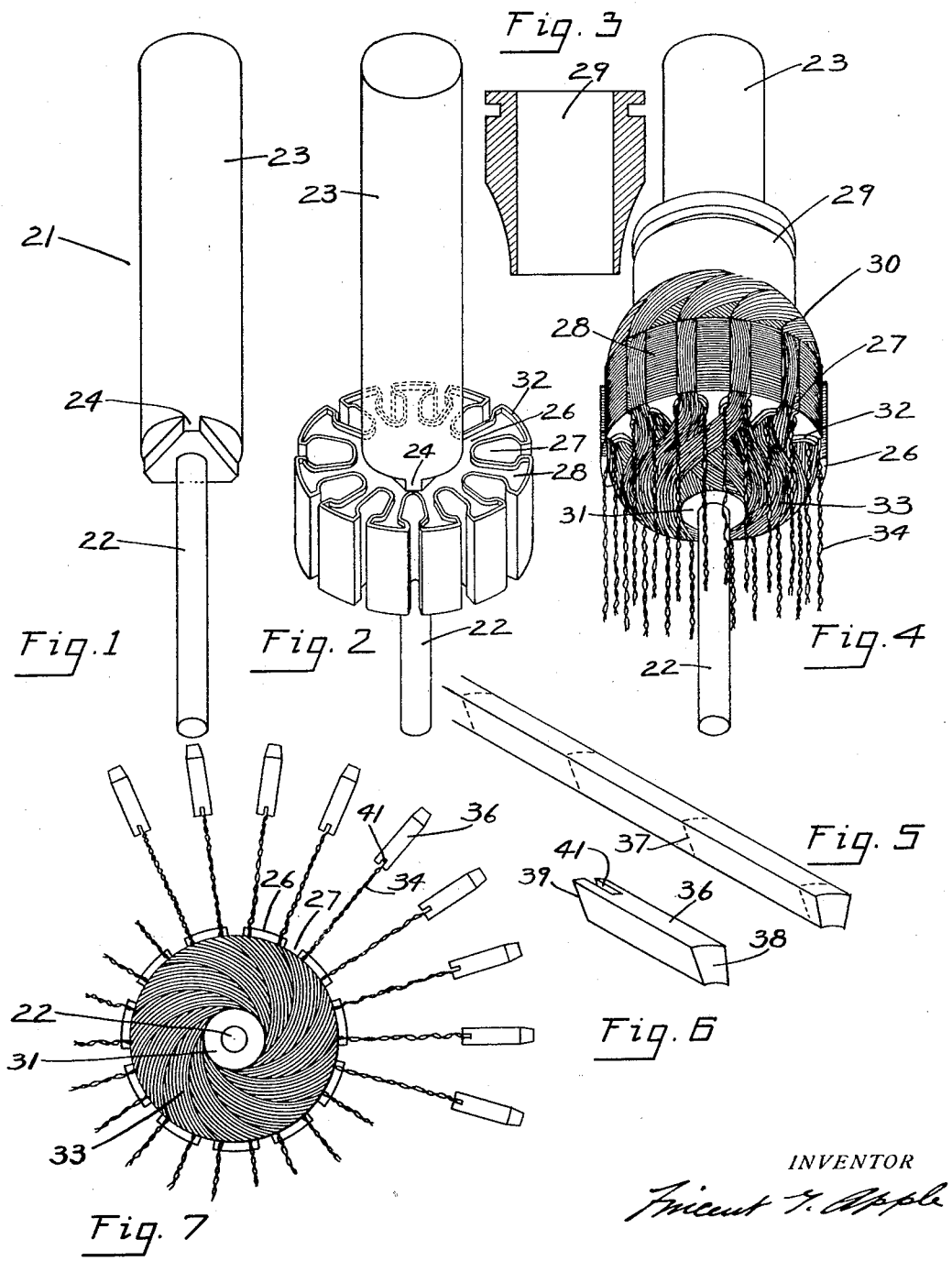

Oct. 31, 1933.    V. G. APPLE    1,932,391
MOLD FOR MAKING ARMATURES
Filed Aug. 2, 1930    4 Sheets-Sheet 2
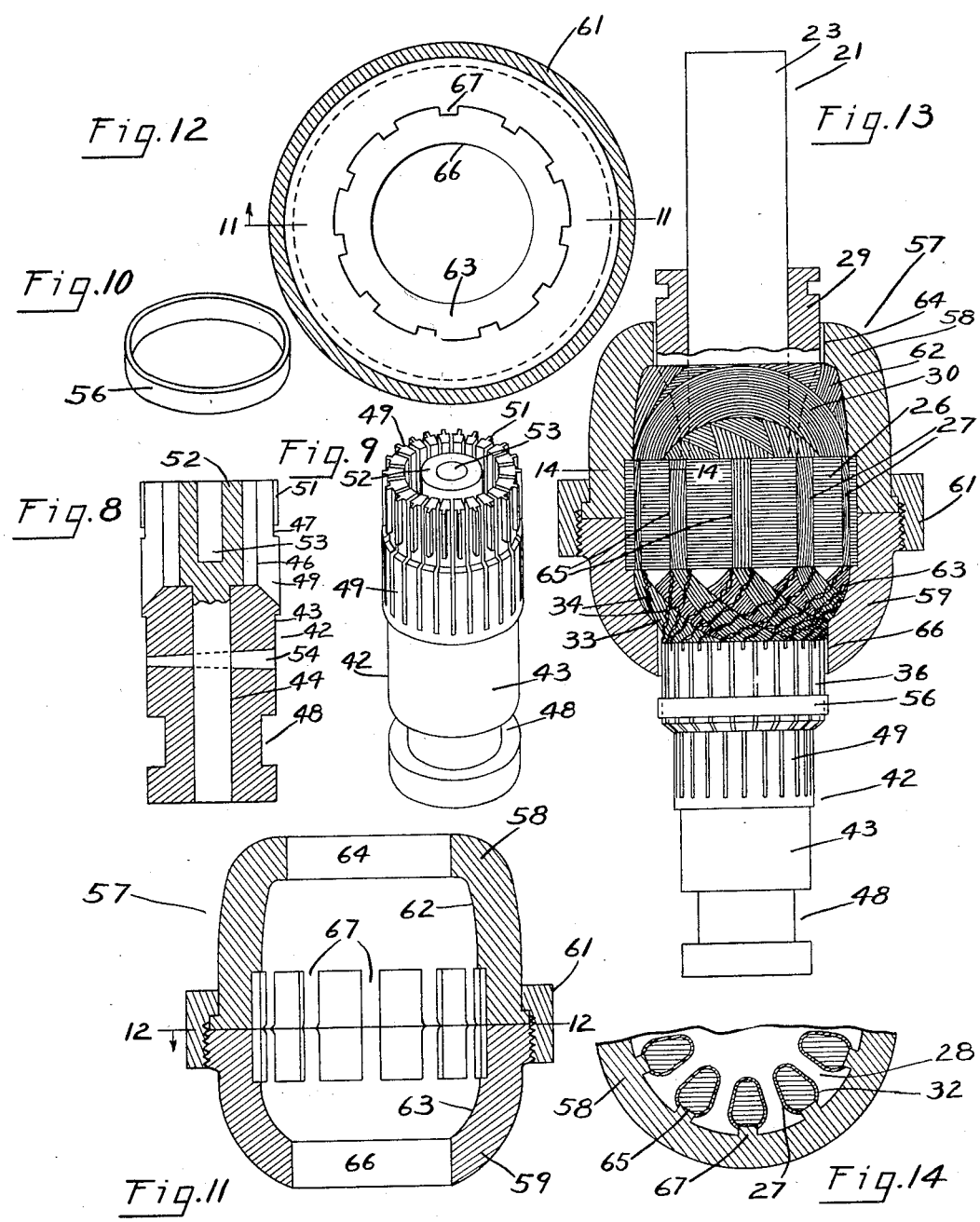
INVENTOR
Vincent G. Apple Oct. 31, 1933.　　　　V. G. APPLE　　　　1,932,391

MOLD FOR MAKING ARMATURES

Filed Aug. 2, 1930　　　4 Sheets-Sheet 3

INVENTOR
Vincent G. Apple

Oct. 31, 1933.        V. G. APPLE        1,932,391
MOLD FOR MAKING ARMATURES
Filed Aug. 2, 1930        4 Sheets-Sheet 4
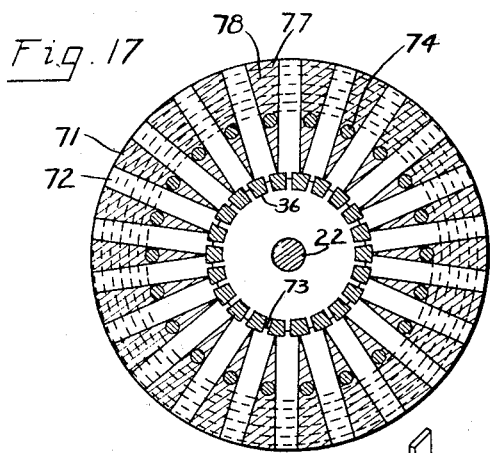
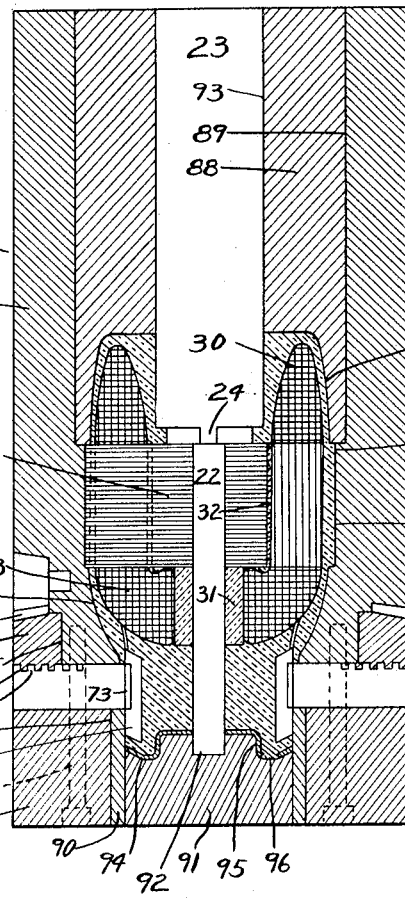
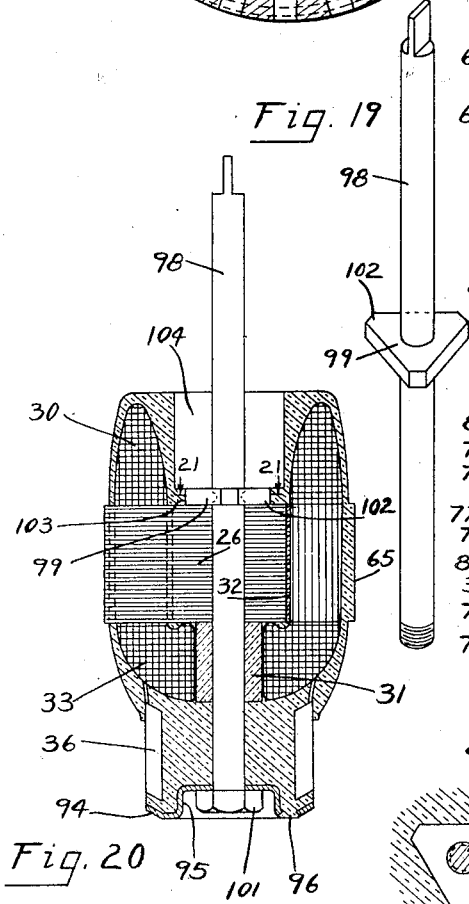
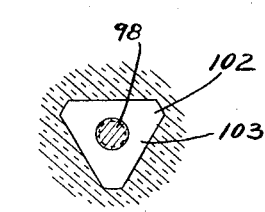
INVENTOR
Vincent G. Apple Patented Oct. 31, 1933

1,932,391

UNITED STATES PATENT OFFICE 1,932,391

MOLD FOR MAKING ARMATURES

Vincent G. Apple, Dayton, Ohio; Herbert F. Apple, Edward M. Apple and Gourley Darroch executors of said Vincent G. Apple, deceased Application August 2, 1930. Serial No. 472,679½

19 Claims. (Cl. 18—42)

This invention is shown, though not claimed, in my copending application Serial No. 436,149, filed March 15th, 1930, and relates to a mold for forming about the armature a single mass of insulation comprising a jacket for the winding and a core for the commutator.

An object of the invention is to provide a mold which will facilitate the placing of the mass of insulation with minimum expenditure of time and with fewest failures in the product.

Other objects will be apparent from a consideration of the structure hereinafter described and shown in the accompanying drawings in which—

Fig. 1 is a perspective view of a mandrel upon which I assemble the core of my armature.

Fig. 2 shows a core assembled on the mandrel Fig. 1 and with the slots lined with sheet insulation preparatory to placing the winding thereon.

Fig. 3 shows a sleeve adapted to surround the shank of the mandrel Fig. 2 to keep the winding away from the shank.

Fig. 4 shows the winding in place with extending leads formed of the ends of the wire composing the coils.

Fig. 5 shows a bar of stock from which the commutator segments are made.

Fig. 6 shows a single commutator segment made from bar Fig. 5.

Fig. 7 shows a wound structure Fig. 4 with a segment Fig. 6 electrically joined to each lead.

Fig. 8 is a vertical axial section through a tool used to arrange the segments of the structure Fig. 7 in proper spaced relation.

Fig. 9 shows the tool Fig. 8 in perspective.

Fig. 10 is a ring for holding the segments to the tool Fig. 9.

Fig. 11 is an axial sectional view taken at 11—11 of Fig. 12 through an envelope within which the armature is placed to bring the winding to a definite shape.

Fig. 12 is a transverse section taken at 12—12 of Fig. 11.

Fig. 13 shows the tools Figs. 1, 3, 9, 10 and 11 assembled with an armature.

Fig. 14 is a transverse section taken at 14—14 of Fig. 13.

Fig. 17 is a transverse section taken at 17—17 of Fig. 16.

Fig. 18 shows the armature in the mold after the jacket of insulation has been molded about it.

Fig. 19 shows the shaft with which the armature is to be assembled.

Fig. 20 shows the armature with the mandrel Fig. 1 removed and the shaft Fig. 19 substituted.

Fig. 21 is a section on the line 21—21 of Fig. 20.

Similar numerals refer to similar parts throughout the several views.

Figure 15:
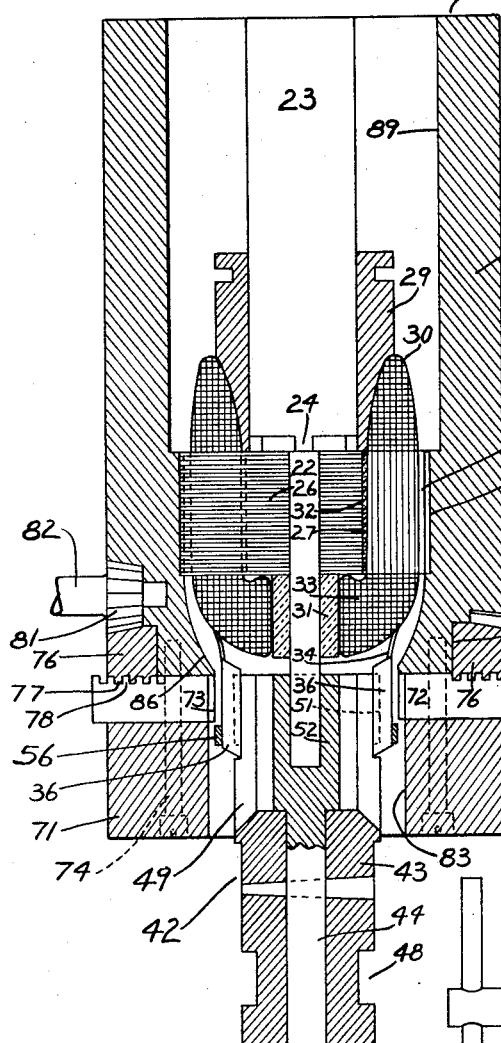
Fig. 15 is a vertical section through a mold into which the armature is being placed.

In the drawings the mandrel 21, Fig. 1, comprises a stem 22 having a diameter equal to the central opening in the core laminæ and a shank 23 of larger diameter. The shank 23 is flattened on three sides for producing clutch like projections 24.

A core 26, Fig. 2, having winding slots 27 separated by teeth 28 is placed on the stem 22, and a single strip 32 of sheet insulation is fitted around the core to extend into and line all of the slots 27. The sleeve 29 is then placed over the shank 23 of the mandrel at one end of the core and a bushing 31 of insulation over the stem 22 at the other end of the core, after which the winding may be placed as shown in Fig. 4. The bushing 31 is intended to become a permanent part of the armature, but the sleeve 29 is adapted to be later withdrawn in order to make space between the winding head 30 and the shank 23 into which plastic insulation may be pressed.

A winding of cotton or other fibrous covered wire is next placed on the core, the front head 33 around bushing 31 and the back head 30 around sleeve 29. Leads 34 extend from the winding for connection to commutator bars as in common practice. But before the winding is placed on the core the covering of the wire is preferably saturated and coated with a liquid insulation and partly dried, in order that the pressure incident to the subsequent molding operation will not break down the insulation between adjacent turns, although if desired the winding may be impregnated with liquid insulation and baked after the winding is on the core.

In Fig. 6 I show one of the segments 36 which I use to compose a commutator for my armature. To make these segments I provide wire of trapeziform cross section (see Fig. 5) and cut it into lengths by cutting through the wire at an angle as at 37. Thus for each cut there is produced a segment 36 having one end beveled as at 38 and the other as at 39. A lead slot 41 is then easily cut through the corner of each segment as shown.

Fig. 7 shows the structure after a segment 36 has been joined to each of the leads 34. The leads are pressed into the lead slots 41 whereupon they may be welded, brazed, soldered, or otherwise electrically joined to the segments. After they are so joined the segments are arranged in proper formation and bound together to compose a commutator.

Fig. 8 is a vertical axial section through a tool 42 around which the segments are temporarily assembled in order that they may be more easily entered into the mold. The tool consists of a cylindrical body 43 bored at 44 and counterbored at 46, with annular grooves 47 and 48 encircling it. The counterbored portion 46 is divided by a series of longitudinal cuts into prongs 49 and each prong is further milled at the outer diameter from the free end to the groove 47 to provide an integral key 51 extending outwardly therefrom. A plug 52 bored at 53 is fitted into opening 44 and secured by pin 54. Tool 42 is also shown in perspective in Fig. 9.

When an armature has been wound and has its commutator segments connected to its leads as shown in Fig. 7, the tool 42 is placed over stem 22 of the mandrel 21 and segments 36 are laid around the tool with keys 51 of the tool extending outwardly between the segments (see Figs 13 and 15). Ring 56, Fig. 10 is now forced over the outside of segments 36, the prongs 49 springing slightly inward to permit the ring to go over.

Inasmuch as the insulation saturated winding is preferably baked to harden it before the jacket of plastic insulation is molded thereabout, a number of advantages may be gained by holding the winding in a definite shape while it is being hardened, first, because, by drawing the coils and coil heads into circular form concentric with the axis of rotation and hardening them in this shape, a better mechanical balance may be had and the jacket over them will be of more uniform thickness, and second, because, if the jacket is to be molded around both coil heads at a single operation, passages through which the plastic insulation may pass from one end of the core to the other must be provided. Such passages are readily provided by keeping vacant a portion 65 of each winding slot 27 at its outer edge.

The envelope 57, Figs. 11 and 12, is made in two halves 58 and 59 held together by nut 61 and has cupped ends 62 and 63, an opening 64 for sleeve 29 to extend through, an opening 66 to clear the cylindrical row of segments 36, and a series of inwardly extending keys 67 to enter the outer portions 65 of slots 27 to press the coils inwardly and compact them more closely into the bottoms of the slots and thereby leave spaces 65 at the outer ends of the slots after the coils are hardened.

Fig. 13 shows the armature structure assembled with the tools shown in Figs. 1, 2, 9, 10 and 11 ready to be baked to harden the winding, and it will be observed that the coil heads are closely surrounded and held in definite shape by the envelope 57. By also referring to Fig. 14 it will be seen that the keys 67 keep the coils pressed inward, so that when the coils are hardened and the envelope removed the outer portions 65 of the slots will be vacant.

After baking the assembly Fig. 13 for a sufficient length of time to harden the windings the envelope 57 is removed, but the remaining tools are left on until after the structure is entered in the mold 68 within which the core for the commutator and the jacket for the windings is formed.

Figure 16:
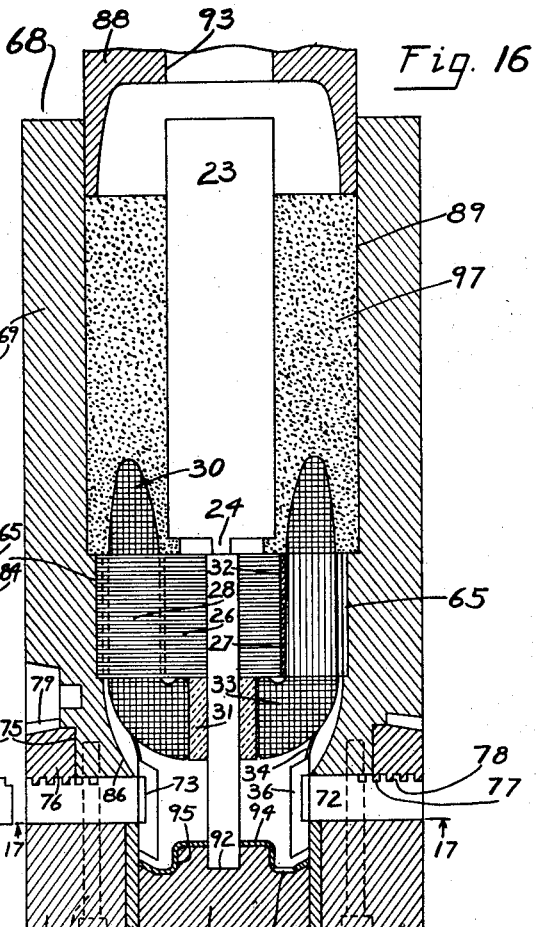
Fig. 16 shows the armature in place ready to mold.
Figures 15A, 16A:
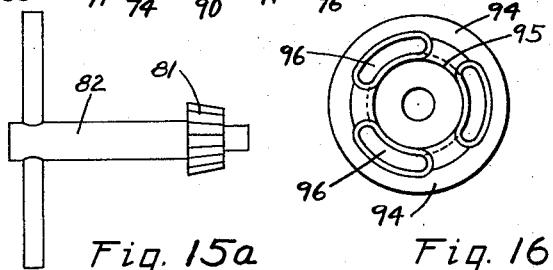
Fig. 15a is a view of a wrench used with the mold.
Fig. 16a is a view of a metal cap for the end of the commutator.

The mold 68 shown at three stages of its operation in Figs. 15, 16 and 18, comprises a cylindrical body in two parts 69 and 71. The upper surface of part 71 has a plurality of radial slots in which are radially movable jaws 72 equal in number to the number of commutator segments. Each jaw has a spacing tang 73 equal in thickness to the space between adjacent bars of the commutator. Screws 74 hold part 69 to the upper surface of part 71 which closes the tops of the radial slots to keep the jaws 72 from upward movement.

The lower end of body 69 is reduced in outside diameter at 75 and the ring 76 is rotatable thereabout. Ring 76 has a scroll 77 cut in its lower surface and corresponding teeth 78 are carried on the upper surface of the jaws 72, so that rotation of ring 76 in one direction moves jaws 72 radially inward and rotation in the other direction moves them radially outward.

On the upper surface of ring 76, are beveled gear teeth 79, and corresponding teeth 81 cut on the end of wrench 82 are adapted to engage the teeth of the ring to revolve it.

The inner dimensions and contour of the mold of course corresponds to the finished armature. The inner diameter of the opening at 83 is such as to permit the passage and removal of the ring 56. At 84 the mold is fitted to the diameter of the core, and the shape and size of the opening at 86 and 87 corresponds to the front and back heads of the winding respectively. Openings 84 and 86 are formed in part 69 of the body while opening 83 is formed in part 71 and opening 87 in the lower end of the vertically movable plunger 88 which is in turn slidably fitted to opening 89 in body part 69.

At the bottom end of the mold a plug 91 is slidably mounted in a ring 90 and fitted to opening 83. The upper end of plug 91 is shaped to suit the end of the finished armature. A small opening 92 in the top of plug 91 receives the end of stem 22 of mandrel 21. A larger opening 93 in plunger 88 is slidably fitted over shank 23 of the mandrel. The ring 90 permits the removal of the ring 56 and allows the plug 91 to be pressed upward to remove the armature from the mold.

In operation the ring 90, the plug 91, and the plunger 88 are removed, and, by manipulation of wrench 82, the jaws 72 are moved radially outward from their normal position. The armature structure, substantially as shown in Fig. 13, but with the envelope 57 removed, is placed in the mold as in Fig. 15, the wrench 82 is manipulated to move jaws 72 radially inward until spacing tangs 73 enter between adjacent segments 36, (see Fig. 17), and until the segments are clamped by the jaws. This clamping action springs the prongs 49 radially inward and loosens ring 56. Tool 42 and ring 56 are now withdrawn, and replaced with ring 90 and plug 91, (see Fig. 16). But before plug 91 is put in place a sheet metal cap 94 is put over the upper end of the plug, as shown. The cup shaped depression 95 of the cap is of sufficient depth to receive a nut which is afterward put on the end of the armature shaft to hold the armature in place. The cap has outwardly tapering openings 96 through which the insulation may extend to hold the cap in place on the end of the armature.

The sleeve 29 is now withdrawn from shank 23 to make space between the back winding head 30 and the shank into which insulation may extend to cover the winding and fill the space around the lugs 24 of the mandrel 21. A proper quantity of unmolded insulation 97 is now put into the opening 89 and the plunger 88 is slightly entered in the top of the opening as shown.

The assembly Fig. 16 is now put in a suitable press, and the plunger 88 is forced downward pressing the insulation about the back head 30, around projections 24 of mandrel 21, downward through the spaces 65, about the front head 33 and further downward between and about the segments 36 and through the tapered openings 96 of the protecting cap 94, to make a jacket for the winding, driving means adapted to engage the armature shaft, a core for the commutator, and holding means to secure the protecting cap in position. While the mold is closed as in Fig. 18 the insulation is hardened.

After the insulation is hardened the armature is removed by applying upward pressure to plug 91 to raise the armature and plunger 88 together out of the body of the mold, then by holding plunger 88 and forcing shank 23 downward and out of the plunger, then by holding the armature itself and forcing the mandrel 23 upwardly out of the armature.

In Fig. 19 I show the shaft 98 which is to support the armature and be rotated thereby. The collar 99 is permanently secured to the shaft and is adapted to limit endwise movement of the armature in one direction, the nut 101 threaded on the end of the shaft limiting its movement in the other direction. Collar 99 also acts as an end thrust bearing collar for the armature. In order to establish driving relation between the shaft and the armature, collar 99 is flattened on three sides to correspond to the mandrel 21, thus producing integral driving tangs 102 adapted to enter driving pockets 103 in the molded insulation which are left when the projections 24 of the mandrel 21 are withdrawn.

Fig. 20 shows the shaft 98 in place in the armature the tangs 102 being in place in the pockets 103, the nut 101 holding the armature against axial movement. It will be observed that because the coil head 30 does not lie close to the shaft 98 there is a space 104 for an armature shaft bearing between the winding and the shaft and within the length of the armature proper. Also because of the depression 95 in the cap 94 the nut 101 is permitted to come flush with the outer edge of the commutator. Both of these features conserve end room, making a shorter motor possible where my improved armature is used.

Having shown and described an embodiment of my invention in which the objects hereinbefore set forth are attained,

I claim,

1. In a mold for forming an integral mass of insulation comprising a jacket for the winding and a core for the commutator, about an assembled dynamo electric machine structure comprising a magnetizable core, a winding and a series of separate commutator segments depending from leads emanating from said winding, the combination of a mold body having an axial opening fitted at the middle portion to the said magnetizable core, said opening being of slightly smaller diameter immediately below the said magnetizable core to restrain downward movement thereof, and being of a diameter but slightly larger than the completed commutator at the lower end of the said opening around the said depending segments, a series of radially movable jaws extending into the said opening at the said lower end, an axially movable plunger fitted to the upper end of the said opening, and a removable bottom for the said opening below the said depending segments.

2. A mold such as defined in claim 1, having means to simultaneously move the series of radially movable jaws.

3. A mold such as is defined in claim 1, having segment spacing tangs at the inner ends of the jaws.

4. A mold such as is defined in claim 1, having teeth in the one edge of each jaw, and a ring having a scroll fitted to said teeth and rotatable about the axis of the armature.

5. A mold such as is defined in claim 1, having teeth on the one edge of each jaw, a ring having a scroll in one side fitted to said teeth and gear teeth in the other side, and a pinion adapted to engage the said gear teeth to rotate said ring about the armature axis.

6. A mold such as is defined in claim 1, in which the removable bottom is adapted to be moved upwardly through the opening to discharge the completed armature therefrom.

7. For the manufacture of commutators, apparatus comprising a ring-like structure adapted to receive a plurality of commutator segments, spacing tangs extending radially inward from said structure adapted to enter between said segments to keep them separated, and means to uniformly increase or decrease the circumferential distance between said spacing tangs.

8. For the manufacture of commutators, apparatus comprising a ring-like structure adapted to receive a plurality of commutator segments, spacing tangs extending radially inward from said structure adapted to enter between said segments to keep them separated, and means to move said spacing tangs radially inward to decrease the circumferential distance therebetween, and means to guide said tangs in uniformly spaced radial paths.

9. For the manufacture of commutators, apparatus comprising a structure having a hollow cylindrical chamber spacing tangs at its inner diameter forming pockets therebetween each adapted to receive a commutator segment freely, radial guide means for said pocket forming means and means to move said pocket forming means radially to decrease the dimensions of said pockets to hold said segments firmly.

10. For the manufacture of commutators, apparatus comprising, a structure having a hollow cylindrical chamber, the wall of which comprises a series of radially movable parts, radial guides for said parts, spacing tangs extending inwardly from the said parts of the wall of said chamber forming pockets into which commutator segments may enter freely, and means to move the said parts of said wall radially inward to decrease the diameter of said chamber sufficiently to grip said segments between the inner wall of said chamber and the sides of said spacing tangs.

11. For the manufacture of commutators, apparatus comprising a cylindrical member having a plurality of radially extending spacing tangs at its inner diameter, a plurality of radially movable jaws, radial guides for said jaws in said member and means to move said jaws in said guides.

12. In a tool for making commutators, the combination of a member having a cylindrical chamber, a plurality of radially movable jaws carrying commutator segment spacing tangs extending through the inner wall of said chamber radial guides for said jaws in said member, and means to move said jaws in said guides.

13. A tool for making commutators comprising in combination, a plurality of circumferentially arranged uniformly spaced contractable clamps each adapted to receive a commutator segment freely when open, means to contract said clamps to grip said segments firmly to hold them in circumferentially spaced apart relation, and means to mold insulating material between and about the spaced apart segments while they are so held.

14. A tool for making commutators comprising in combination, a body having a cylindrical opening, the one end of which comprises a stock chamber for holding a quantity of unmolded insulation, a plurality of contractable circumferentially spaced apart clamps in the other end of said opening, each adapted to receive a commutator segment freely, means in said body to contract said clamps to grip said segments firmly, and a plunger for forcing said material from said stock chamber between and about said segments.

15. For building commutators of the character herein described, molding apparatus comprising, in combination, a mold, means to temporarily retain the commutator segments in correct location by holding them at their inner edges until they may be placed in said mold, means associated with the mold to hold said segments at their outer edges to permit removal of the first said holding means and means to force insulation into the place vacated by the first holding means.

16. For building armatures of the character herein described, molding apparatus comprising, in combination, a mold having an internal cavity corresponding to the completed armature, means apart from said mold to temporarily locate the commutator segments in correct radial and angular relation to the core slots until the armature may be placed in the mold, means associated with said mold to hold the said segments in the same said relation to permit the first said holding means to be removed, and means to force insulation into the spaces vacated by the first said holding means.

17. For making a commutator integral with a wire wound armature having a series of separate commutator segments depending from the winding, apparatus comprising, in combination, a body having a cylindrical opening to receive the armature, means in said opening intermediate the ends for holding said armature against endwise movement in said opening, a plurality of commutator segment clamping means equally spaced around the lower end of said opening, each said clamping means being openable to receive a segment freely or closable to grip a segment firmly, means to open and close said clamping means, and a plunger, for forcing insulation around said winding and segments, slidably fitted to the upper end of said opening.

18. For making an integral armature and commutator by molding a body of insulation about a wire wound armature core having a series of separate commutator segments depending from the winding, apparatus comprising, in combination, a body having a cylindrical opening adapted to contain an armature core midway of the length of said opening, means to prevent downward movement of said core in said opening, a series of commutator segment clamping means equally spaced around the lower end of said opening, said clamping means being radially movable outwardly to hold the segments freely and inwardly to grip the segments firmly, and a plunger for forcing a body of insulation about the winding and segments slidable axially in the upper end of said opening.

19. For making dynamo electric machine armatures in which the windings are imbedded in a mass of insulation and in which a removable shaft has driving tangs seated in pockets formed in said insulation, apparatus comprising, in combination, a mandrel fitted to the shaft opening of said armature, clutch like projections on said mandrel adjacent the end of said armature, a mold body closely surrounding said armature, a plunger fitted to said mold body for forcing said insulation around said mandrel and said clutch like projections, and a removable sleeve for keeping the winding spaced apart from the mandrel.

VINCENT G. APPLE.